(12) United States Patent
Aritomi (10) Patent No.: US 7,933,031 B2
(45) Date of Patent: Apr. 26, 2011

(54) INFORMATION PROCESSING APPARATUS AND METHOD FOR INHIBITING PRINTING OF SECURE DOCUMENTS

(75) Inventor: Masanori Aritomi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1082 days.

(21) Appl. No.: 11/312,050

(22) Filed: Dec. 20, 2005

(65) Prior Publication Data
US 2006/0132824 A1  Jun. 22, 2006

(30) Foreign Application Priority Data

Dec. 22, 2004  (JP) ................. 2004-371887
Dec. 13, 2005  (JP) ................. 2005-359122

(51) Int. Cl.
*G06K 15/00* (2006.01)
(52) U.S. Cl. ........ 358/1.14; 358/1.15; 399/80; 713/155; 726/4; 726/27; 726/28; 726/30; 726/32; 726/33
(58) Field of Classification Search ............... 358/1.14, 358/1.15, 1.16; 399/80; 713/155; 726/27, 726/32, 33
See application file for complete search history.

(56) References Cited

U.S. PATENT DOCUMENTS

| | | | |
|---|---|---|---|
| 6,173,316 B1 * | 1/2001 | De Boor et al. ............... 709/218 |
| 6,635,089 B1 * | 10/2003 | Burkett et al. ................. 715/235 |
| 6,807,388 B1 * | 10/2004 | Kojima et al. ................... 399/80 |
| 7,110,541 B1 * | 9/2006 | Lunt et al. ........................ 380/51 |
| 2002/0182228 A1 | 12/2002 | Collins |
| 2003/0131002 A1 * | 7/2003 | Gennetten et al. ............. 707/10 |
| 2003/0182475 A1 * | 9/2003 | Gimenez .......................... 710/8 |
| 2004/0125402 A1 | 7/2004 | Kanai et al. |
| 2005/0018238 A1 * | 1/2005 | Schell .......................... 358/1.15 |
| 2006/0080316 A1 * | 4/2006 | Gilmore et al. .................. 707/9 |

FOREIGN PATENT DOCUMENTS

| | | |
|---|---|---|
| CN | 1217122 A | 5/1999 |
| JP | 2000-253241 | 9/2000 |
| JP | 2001-205893 | 7/2001 |
| JP | 2002-057895 | 2/2002 |
| JP | 2004-094401 | 3/2004 |
| JP | 2004-152623 | 5/2004 |
| WO | WO 97/36417 | 10/1997 |

* cited by examiner

*Primary Examiner* — King Y Poon
*Assistant Examiner* — David S Cammack
(74) *Attorney, Agent, or Firm* — Cowan, Liebowitz & Latman, P.C.

(57) ABSTRACT

Generation/non-generation of print data for a printer driver is controlled in correspondence with an external print policy for a document to be printed. The print policy includes a print policy file, and defines print-inhibited items in a predetermined description. The predetermined description includes a description directly stored in the print policy file, and a description that requires an external reference.

13 Claims, 9 Drawing Sheets

INFORMATION PROCESSING APPARATUS AND METHOD FOR INHIBITING PRINTING OF SECURE DOCUMENTS

FIELD OF THE INVENTION

The present invention relates to a print technique for outputting print data to a printing apparatus.

BACKGROUND OF THE INVENTION

A printer driver installed in a general PC (personal computer) generates a print stream if it is requested. This printer driver also has a function of canceling print processing. Japanese Patent Laid-Open No. 2000-253241 describes that upon sending print data from a personal computer (PC) to a printer via a printer driver on the PC, the print data of the printer driver of the PC is monitored to monitor copy inhibition information. In the description of this reference, the monitored print data (e.g., PDL data) is interpreted to check if it includes a specific character string or image. If it is determined that the specific character string or image is included, a print data transfer stop command is sent to the printer driver.

Conventionally, whether or not print processing is to be executed is determined to see if a connection path between the PC and printing apparatus is assured based on a use limitation. Hence, if a condition in which the PC makes the printing apparatus execute the print processing is met, data which is compatible with the printer driver can be printed. In this case, even data which is not preferably printed or should not be printed in a public place due to high security is printed if it is transmitted to the printing apparatus, thus posing a problem in terms of security of a highly confidential document.

In the example of Japanese Patent Laid-Open No. 2000-253241, print data of the printer driver is monitored parallel to generation and transfer of the print data by the printer driver so as to check if a copy inhibition image is included. Hence, depending on the check timing, the transfer inhibition command may be issued after transfer of print data from the printer driver is completed.

SUMMARY OF THE INVENTION

The present invention has been made in consideration of the aforementioned problems, and has as its object to control permission/inhibition of generation of print data for a printer driver in correspondence with an external print policy with respect to a document to be printed. The print policy includes a print policy file and defines print-inhibited items in a predetermined description. The predetermined description includes a description directly stored in the print policy file, and a description that requires an external reference.

In order to achieve an object of the present invention, for example, an information processing apparatus of the present invention comprises the following arrangement.

That is, an information processing apparatus connected to a printing apparatus through a communication medium, comprising:

output means for generating print data based on document data, and outputting the generated print data to the printing apparatus;

examination means for examining the presence/absence of a predetermined description specified by an external print policy in the document data with reference to the print policy; and print data control means for controlling generation of print data by the output means in accordance with an examination result of the examination means, wherein when it is determined as a result of the examination of the examination means that the document data includes the predetermined description specified by the print policy, the print data control means cancels generation of print data by the output means.

In order to achieve an object of the present invention, for example, a method of controlling an information processing apparatus of the present invention comprises the following arrangement.

That is, a method of controlling an information processing apparatus connected to a printing apparatus through a communication medium, comprising:

an output step of generating print data based on document data, and outputting the generated print data to the printing apparatus;

an examination step of examining the presence/absence of a predetermined description specified by an external print policy in the document data with reference to the print policy; and a print data control step of controlling generation of print data in the output step in accordance with an examination result of the examination step, wherein the print data control step includes a step of canceling, when it is determined as a result of the examination in the examination step that the document data includes the predetermined description specified by the print policy, generation of print data in the output step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
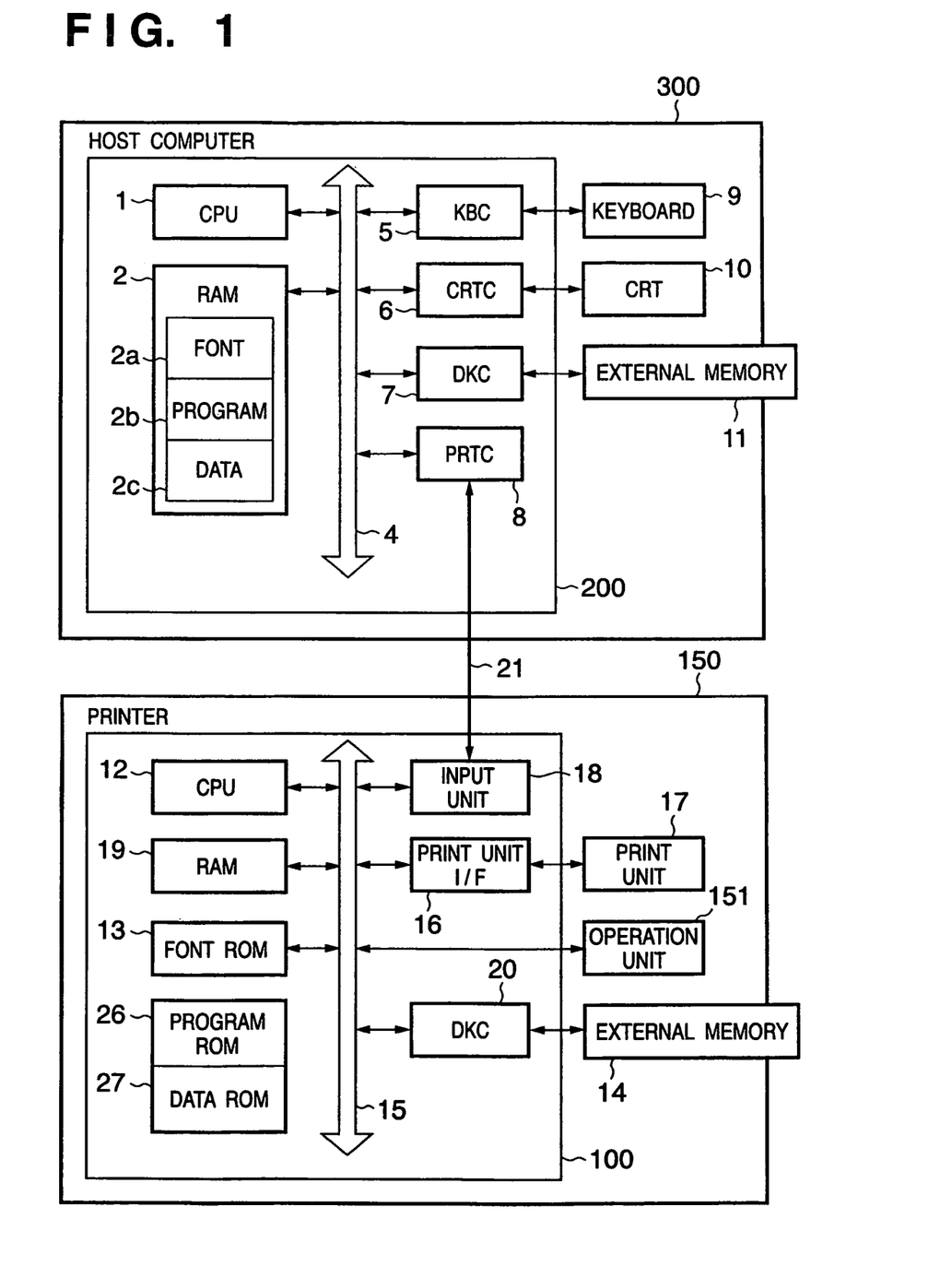
FIG. 1 is a block diagram showing the basic arrangement of a print system according to an embodiment of the present invention.

FIG. 1 is a block diagram showing the basic arrangement of a print system according to this embodiment. As shown in FIG. 1, the print system according to this embodiment includes a host computer 300 and printer 150, which are connected to each other via a network such as a LAN, Internet, or the like.

The host computer 300 will be described first. The host computer 300 is a general PC (personal computer) or WS (workstation), and comprises a CPU 1, RAM 2, KBC (keyboard controller) 5, keyboard 9, CRTC (CRT controller) 6, CRT 10, DKC (disk controller) 7, external memory 11, PRTC (printer controller) 8, and bus 4, as shown in FIG. 1.

The CPU 1 controls the overall host computer 300 using programs and data held in the RAM 2, and executes respective processes (to be described later) to be implemented by the host computer 300.

The RAM 2 comprises an area for temporarily storing programs and data loaded from the external memory 11. In FIG. 1, the RAM 2 comprises an area 2a for storing font data used to create document data, area 2b for storing programs for making the CPU 1 execute various processes, and area 2c for storing other data. However, areas used for other purposes are assured, and the areas of the RAM 2 are not limited to those in FIG. 1. The RAM 2 also comprises a work area used when the CPU 1 executes various processes.

The KBC 5 executes processing for, when a key on the keyboard 9 is operated, notifying the CPU 1 of the operated key. The keyboard 9 serves as an input interface for inputting various instructions to the CPU 1, as is well known.

The CRTC 6 serves as an interface for outputting a signal according to image data (including an image and text) generated by the CPU 1 to the CRT 10. The CRT 10 displays an image and text based on this image signal.

The external memory 11 is a large-capacity information storage device represented by a hard disk drive device, which saves an OS, and programs and data for making the CPU 1 execute respective processes (to be described later) to be implemented by the host computer 300. Some or all of these programs and data are loaded onto the RAM 2 via the DKC 7 under the control of the CPU 1.

Note that some or all of these programs and data may be recorded in a recording medium such as a CD-ROM, DVD-ROM, or the like, may be read out via a recording medium drive device, and may be loaded onto the RAM 2. In this case, this recording medium drive device must be connected to the host computer 300. Hence, such means for supplying the programs and data to the host computer 300 is not particularly limited.

The PRTC 8 connects the host computer 300 to the network and controls data communications with the printer 150.

The aforementioned CPU 1, RAM 2, KBC 5, CRTC 6, DKC 7, and PRTC 8 can make data communications each other via the bus 4.

With the above arrangement, the host computer 300 can convert image data and document data to be printed by the printer 150 into print data, and can output it to the printer 150.

The printer 150 will be described below. This embodiment uses a stand-alone printer as the printer 150. However, the present invention is not limited to this. For example, the printer 150 may be a part of a multi-functional peripheral, or apparatuses which include the printer 150 in arbitrary forms may be used.

As shown in FIG. 1, the printer 150 comprises a CPU 12, RAM 19, font ROM 13, program ROM 26, data ROM 27, input unit 18, print unit I/F (interface) 16, print unit 17, operation unit 151, DKC 20, and bus 15.

The CPU 12 controls the entire printer 150 using programs and data stored in the font ROM 13, program ROM 26, and data ROM 27, or control programs stored in an external memory 14, and executes respective processes (to be described later) to be implemented by the printer 150.

The RAM 19 comprises an area for temporarily storing some or all of data received from the host computer 300 via the input unit 18, and also a work area used when the CPU 12 executes respective processes.

The font ROM 13 stores font data used when an image is generated based on print data received from the host computer 300.

The program ROM 26 stores programs which make the CPU 12 control the entire printer 150 and execute processes (to be described later) to be implemented by the printer 150.

The data ROM 27 stores information used on the host computer 300 or the like in case of the printer 150 which does not use any external memory 14.

The input unit 18 serves as an interface for receiving print data transmitted from the host computer 300, and the received data is output to the RAM 19 or DKC 20. The CPU 12 can output various messages to the host computer 300 via the input unit 18.

The print unit 17 executes processing for forming an image and characters on a print medium such as a paper sheet or the like on the basis of image data which is generated by the CPU 12 based on print data received from the host computer 300. For this purpose, the print unit 17 receives an image signal based on print data via the print unit I/F 16. This image signal is generated by the print unit I/F 16 based on image data generated by the CPU 12.

The operation unit 151 includes a button group, a touch panel, and the like used to input various instructions to the CPU 12.

The external memory 14 has an area for temporarily storing data transmitted from the host computer 300 via the input unit 18. The DKC 20 serves as an interface for connecting this external memory 14 to the bus 15.

At least one external memory 14 described above is equipped. Also, a plurality of external memories such as an option font card in addition to built-in font data, an external memory that stores a program used to interpret a printer control language of a different control system and the like may be connected. Furthermore, an NVRAM as a nonvolatile memory may be equipped, and may store printer mode setting information from the operation unit 151.

Figure 2:
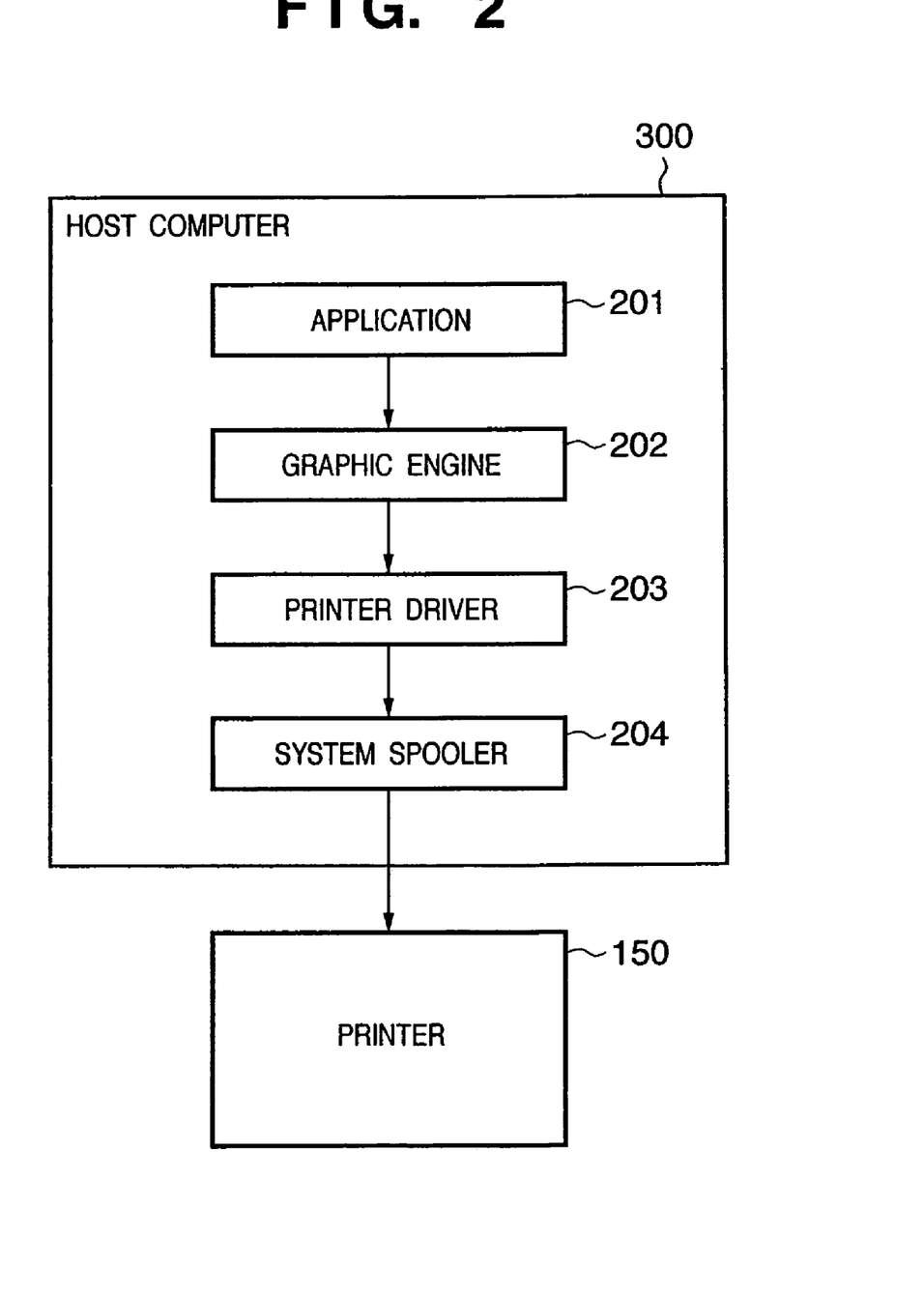
FIG. 2 is a block diagram showing the functional arrangement in a host computer 300 which is required to make a printer 150 execute print processing.

FIG. 2 is a block diagram showing the functional arrangement in the host computer 300, which is required to make the printer 150 execute print processing. A printing apparatus such as the printer 150 or the like is connected to the host computer 300 directly or via a network.

An application 201, graphic engine 202, printer driver 203, and system spooler 204 are program modules which exist as files saved in the external memory 11, and are loaded onto the RAM 2 and executed by an operating system (OS) or other modules. The application 201 and printer driver 203 can be added to the external memory 11 via an FD, CD-ROM, or network (not shown).

The application 201 is used to create document data to be printed. When a print instruction is input for the created document data, the application 201 outputs this document data to the next graphic engine 202. The graphic engine 202 executes rendering processing based on the received document data. The graphic engine 202 similarly loads the printer driver 203 prepared for each printer from the external memory 11 onto the RAM 2, and converts the output from the application 201 into control commands of the printer 150 using the printer driver 203. The converted printer control commands are output to the printer 150 via the system spooler 204 loaded onto the RAM 2 by the OS and the interface 21.

Figure 3:
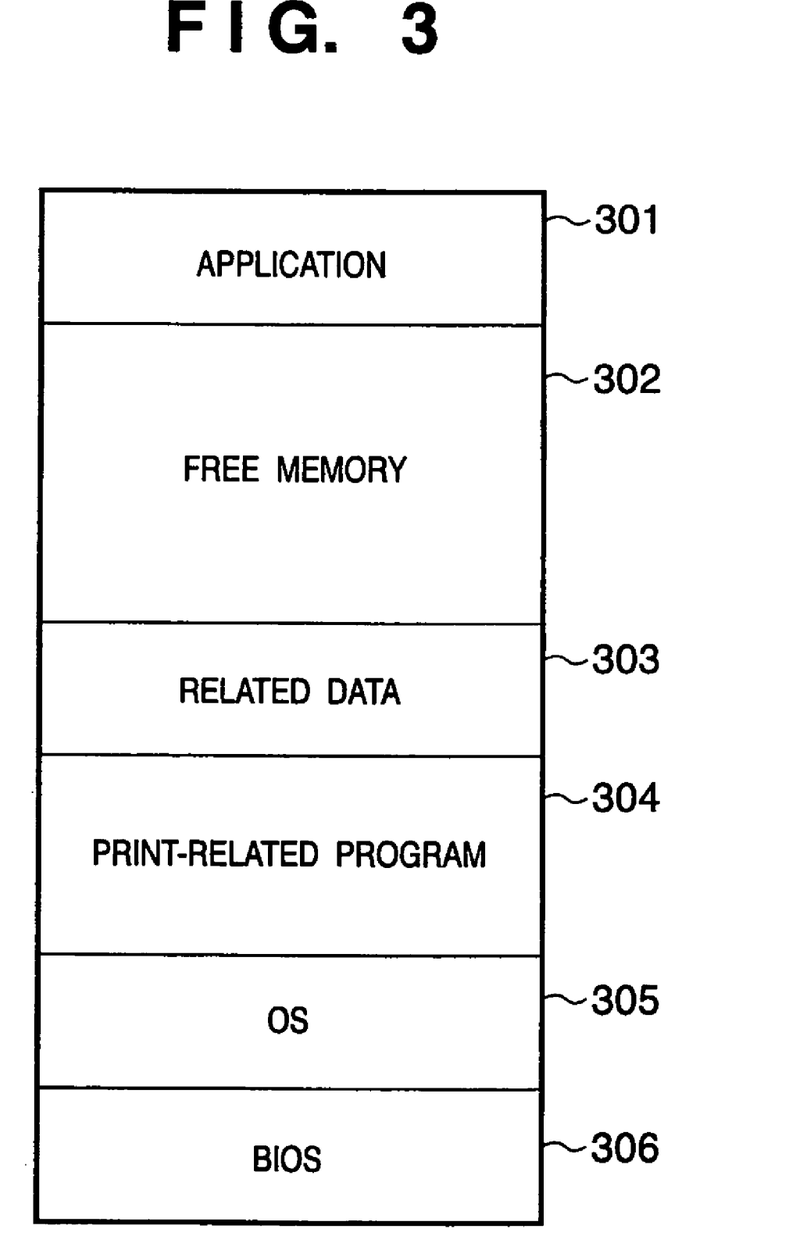
FIG. 3 shows a memory map when print-related modules including a print program according to the embodiment of the present invention are loaded onto a RAM 2 on the host computer 300 and are ready to run.

FIG. 3 shows a memory map when print related modules including a print program according to the embodiment of the present invention are loaded onto the RAM 2 on the host computer 300 and are ready to run.

Referring to FIG. 3, reference numeral 301 denotes a print application; 302, a free memory; 303, print-related data; 304, a print-related program; 305, an OS; and 306, a BIOS. A print control program of this embodiment exists as a part of the print-related program 304.

Figure 4:
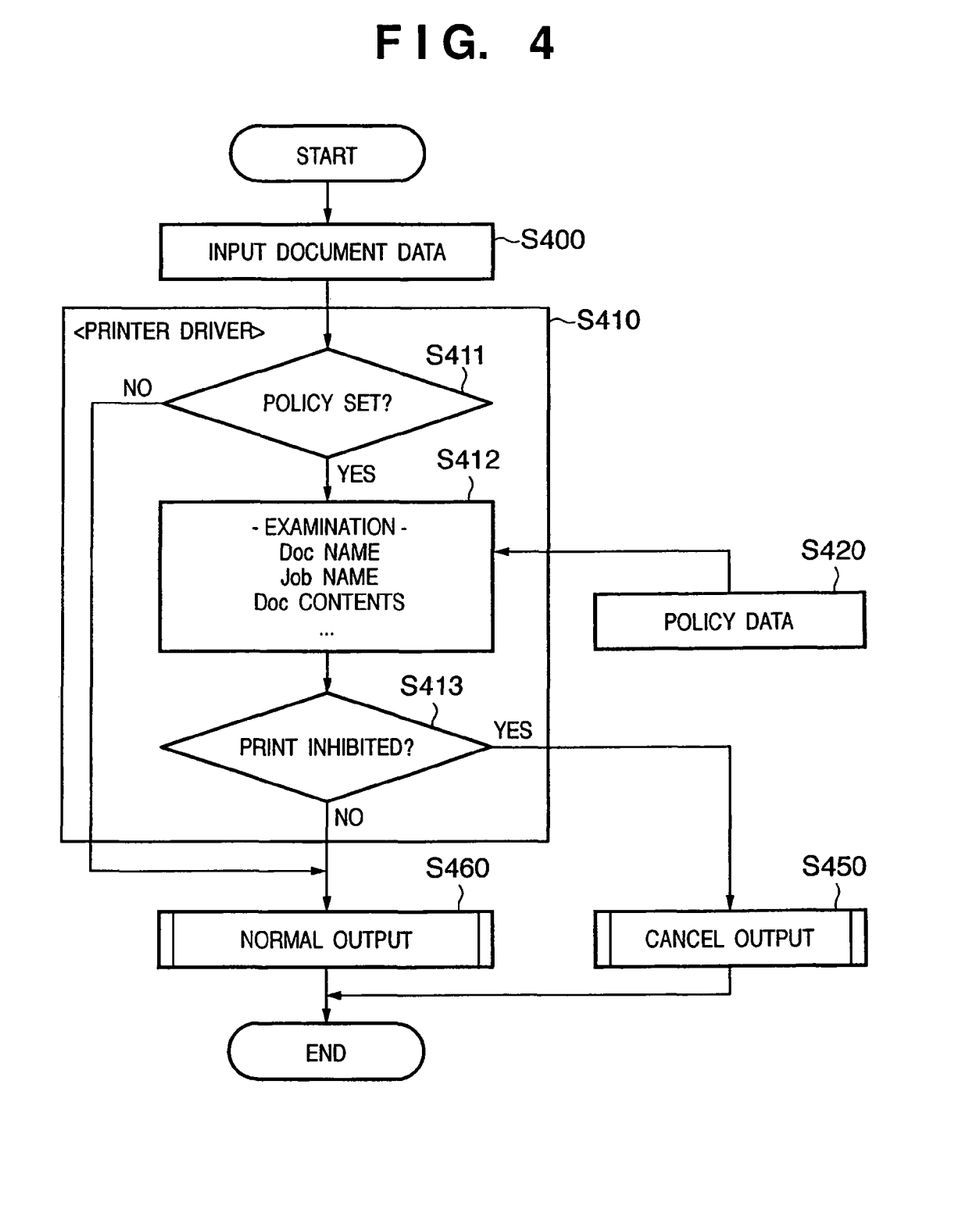
FIG. 4 is a flowchart of print processing to be executed by the host computer 300 when a print instruction for document data held on the host computer 300 side is input.

The print processing to be executed by the host computer 300 when a print instruction is input for document data held on the host computer 300 side will be described below using FIG. 4 which is a flowchart of that processing. Note that programs and data required to make the CPU 1 execute the processing according to the flowchart shown in FIG. 4 are saved in the external memory 14 and are loaded onto the RAM 2 as needed under the control of the CPU 1, and the CPU 1 executes the processing using the loaded programs and data, so that the host computer 300 implements respective processes to be described below.

When the operator of the host computer 300 designates document data to be printed using the keyboard 9 and inputs a print instruction for this document data, the CPU 1 detects this, loads the document data to be printed from the external memory 14 onto the RAM 2, and passes it to the printer driver of the printer 150, which is similarly loaded onto the RAM 2 (step S400).

The printer driver executes processes in steps S411 to S413. Upon reception of the document data, the printer driver checks first if a check operation function (policy) is set for this document data (step S411). Since the operator can turn on/off this function on a GUI provided by the printer driver using the keyboard 9, whether or not the check operation function is set is determined with reference to this setting data in this step. Details of this setting will be described later.

If no check operation function is set, the flow jumps to step S460, and so-called normal print processing is executed, i.e., the printer driver generates print data based on this document data and outputs it to the printer 150. On the other hand, if the check operation function is set, the flow advances to step S412, policy data 420 which describes conditions to be met by this document data is loaded from the external memory 14 onto the RAM 2, and it is checked with reference to this data if this document data is inhibited from being printed (S412). Details of this check operation will be described later.

As a result of this check operation, it is determined if this document data can be printed or is inhibited from being printed (S413). If the document data can be printed, the flow advances to step S460, and the printer driver generates print data and executes the normal print operation (step S460).

On the other hand, if the print processing is to be inhibited, the flow advances to step S450 to execute processing for canceling the print processing of this document data (step S450). That is, the printer driver does not generate any print data.

Figure 5:
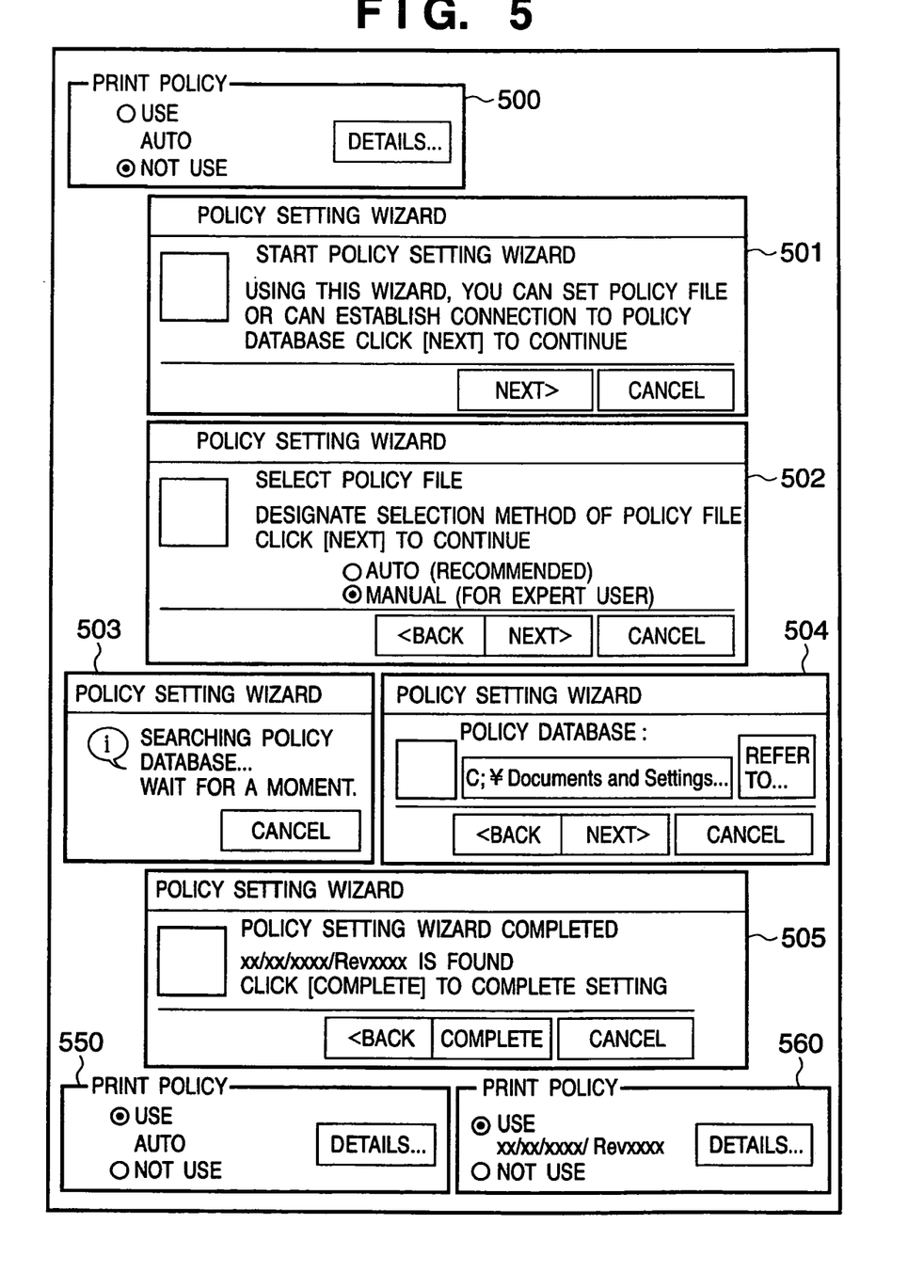
FIG. 5 is a view showing GUIs that pertain to settings of a check operation function along the flow of the settings.

FIG. 5 shows GUIs associated with the settings of the check operation function along the flow of the settings. Note that the GUIs shown in FIG. 5 are provided by the printer driver, and are displayed on the display screen of the CRT 10.

When the operator of the host computer 300 inputs an instruction to set the check operation function using the keyboard 9, the CPU 1 detects this, and executes the printer driver program saved in the external memory 14 to execute processing for displaying a GUI 500 in FIG. 5 on the display screen of the CRT 10. The operator of the host computer 300 can select a setting/non-setting of the check operation function by designating one of check buttons using the keyboard 9.

When the operator designates a check button "not use", the CPU 1 does not set the check operation function. On the other hand, when the operator designates a check button "use", the CPU 1 sets the check operation function. When the check operation is to be made, policy data is used, as described above. In this case, as a default, policy data which is installed simultaneously with the printer driver or is set by an administrator by batch processing is used. Hence, text "auto" is displayed on the GUI 500 in FIG. 5.

Note that various policy data can be generated in accordance with various situations, and can be saved on the external memory 14 or the network to which the host computer 300 is connected. For this reason, desired one of policy data generated in advance may be used in place of default one. Hence, when the operator designates a button icon "details" on the GUI 500 in FIG. 5 using the keyboard 9, the CPU 1 detects this, and displays a GUI 501 on the display screen of the CRT 10. When the operator designates a button icon "next>" using the keyboard 9, the CPU 1 detects this, and displays a GUI 502 on the display screen of the CRT 10.

When the operator designates a button icon "auto" and then a button icon "next>" using the keyboard 9, the CPU 1 detects this, displays a GUI 503 on the display screen of the CRT 10, and searches the external memory 14 or a memory of an apparatus connected to the host computer 300 for policy data. This search processing can be implemented to conduct a search using an extension or file names unique to policy files. If policy data is found, a GUI 505 is displayed on the display screen of the CRT 10 to notify the user of information such as the file name, storage location, and the like of the found policy data. When the operator designates a button icon "complete" using the keyboard 9, the CPU 1 detects this, displays a GUI 550 on the display screen of the CRT 10, and sets the found policy data as that used in step S412.

If a plurality of policy data are found, a GUI which displays them as a list and prompts the operator to select one of these policy data is displayed on the display screen of the CRT 10.

On the other hand, when the operator designates a button icon "manual" and then a button icon "next>" using the keyboard 9, the CPU 1 detects this, and displays a GUI 504 on the display screen of the CRT 10. Then, when the operator inputs the storage location of policy data and designates a button icon "next>" using the keyboard 9, the CPU 1 detects this, displays a GUI 505 on the display screen of the CRT 10, and notifies the operator of information such as the file name, storage location, and the like of the found policy data. When the operator designates a button icon "complete" on this GUI 505 using the keyboard 9, the CPU 1 detects this, displays a GUI 560 on the display screen of the CRT 10, and sets the found policy data as that used in step S412.

In this way, the policy data used in step S412 can be set. The configurations of the GUIs used in this setting processing are not limited to them, and the setting sequence is not particularly limited, either.

This setting sequence can be executed by the printer driver using batch processing. For example, the check operation function is enabled, and it is set in advance to use the policy file set by the administrator. When the user who has the authority of the administrator is externally set, such operation may be inhibited.

Figure 6:
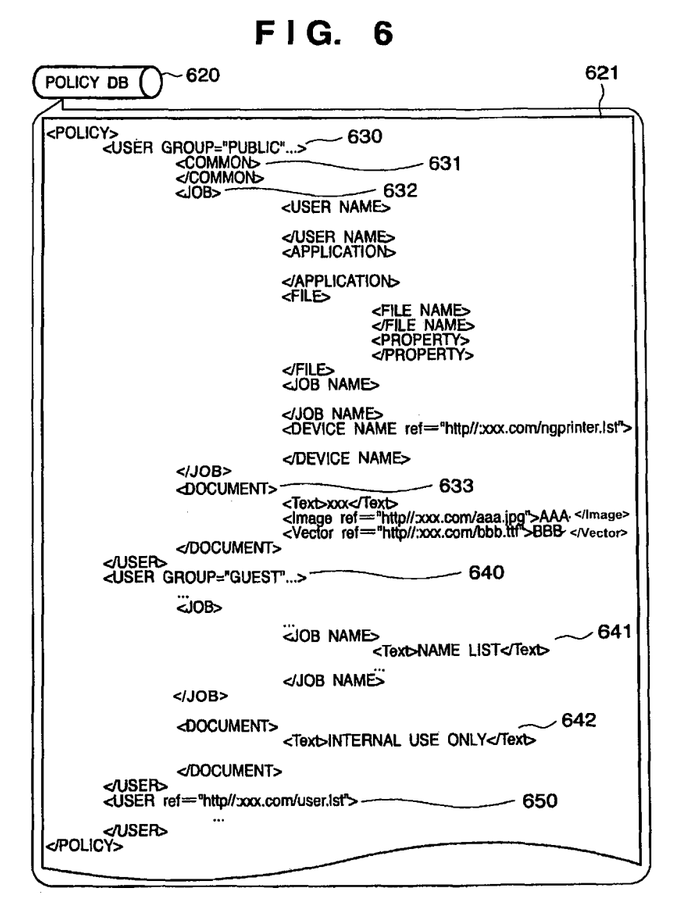
FIG. 6 shows an example of the configuration of a policy data DB.

A DB for policy data saved on the external memory 14 will be described below. FIG. 6 shows an example of the configuration of a policy data DB.

A policy database (DB) 620 has a configuration 621. Policy data corresponds to a file which combines print inhibition conditions, a keyword, and elements as data. This policy DB 620 includes a policy file 621 which is described using a tag format in the same manner as the grammar of HTML (Hypertext Markup Language) or XML (Extensible Markup Language) as the known techniques. One set of three, i.e., a "start tag", "end tag", and "content bounded by the start and end tags" is called one element. A portion bounded by "<" and ">" of each tag is called an element name. Since the element name indicates a tag type, an element is often called using the element name. That is a case when "<element name>content</element name>" is called an "element name" element. More specifically, when the element name is Text, it is called a "Text element". An attribute is used to give additional information to an element. For example, href in a tag <a href=http://www.abcd.jp"> is an attribute.

In case of 641 in FIG. 6, "<Text>name list</Text>" is an element, "<Text>" is a start tag, "</Text>" is an end tag, Text is an element name, and "name list" is the content. Also, "ref" in 650 is an attribute. Since the aforementioned description method is the same as that in HTML and XML, a detailed description thereof will be omitted. In the present invention, this grammar will be referred to as "description" hereinafter.

The policy data shown in FIG. 6 describes a configuration for setting a user authority element 630, job information element 632, document content element 633, and common region element 631 as objects to be checked. Note that the inclusive relationships of respective check items can be changed. FIG. 6 shows a case wherein the common region element 631, job information element 632, and document content element 633 are included below the user authority element 630. This is the same as the HTML and XML grammars.

The policy data 621 is roughly classified into data for "public user" and that for "guest user". 630 indicates that the following contents are those for the public user, and 640 indicates that the following contents are those for the guest user. In 640, "user" in a tag is an element name, "group" is an attribute, and "guest" is an attribute value.

Under the job information element 632, inhibition elements that pertain to a print environment and a job are summarized. For example, when a "keyword which must not be included in the file name of document data to be printed" is described in job.file.file name, if it is determined in the check processing in step S412 that this keyword is included in the file name of a document to be printed, this document can be inhibited from being printed.

When a "keyword which must not be included in the property of document data to be printed" is described in job.file.property, if it is determined in the check processing in step S412 that this keyword is included in the property of a document to be printed, this document can be inhibited from being printed.

If a predetermined user group name is described in job.user name, if it is determined in the check processing in step S412 that a document to be printed is data from the user in this predetermined user group, this document can be inhibited from being printed.

When a predetermined device name is described in job.device name, a document to be printed can be inhibited from being printed by this predetermined device in the check processing in step S412. A device name tag ("device name" element) is a description that requires an external reference to be described later, and a list file (ngprinter.lst) of device names is externally referred to.

Under "document" 633, inhibition elements associated with document contents such as text, vector, image, and the like are summarized. A description ref=" " in each of vector and image objects under 633 is an external reference. That is, entities of vector and image objects are present at locations after "ref", and are not included in this policy file. That is, an image file and vector format file (font or the like) refer to external URLs (Uniform Resource Locators) described in ref. For example, in an Image tag (Image element) under 633, an image file (aaa.jpg) which is externally referred to via an URL (http://xxx.com/aaa.jpg) after ref as an attribute "ref" of the element name "Image" is an image file of a print-inhibited user. This Image tag (Image element) is a description that requires an external reference in the print policy file 621, and a predetermined description of a print-inhibited item. In this case, "AAA" bounded by the start and end tags of the Image tag is a name given to an image file aaa.jpg. Note that an image file is explained using a JPEG (extension=jpg). However, any other image file formats such as a bitmap file (extension=bmp), GIF file (extension=gif), and the like may be used as long as they can be generally externally referred to using URLs.

Likewise, a Vector tag (Vector element) under 633 has a description that externally refers to bbb.ttf as a vector-format file. In this case, a vector font (True Type Font) with an extension "ttf" is exemplified. Since the tag description if the same as that of the aforementioned Image tag, a description thereof will be omitted.

That is, the policy file 621 has a data structure that can select direct storage and external reference for both items and partitions.

Therefore, when characters "confidential" are described in "XXX" of <text>XXX</text>, if it is determined in the check processing in step S412 that characters "confidential" are included in a document to be printed, this document can be inhibited from being printed.

That is, in 641, a text character string "name list" as the contents of the Text element is a print inhibition keyword. This element 641 is a description of direct storage of those of print-inhibited items in the print policy file 621.

Likewise, in 642, a text character string "internal use only" is a print inhibition keyword. The element 642 is a description of direct storage in the print policy file 621, and is a predetermined description of a print-inhibited item.

An element 650 indicates that a print-inhibited user list is located at a URL to be externally referred to and described after an attribute "ref". That is, a file (user.lst) to be externally referred to by a URL (http://xxx.com/user.lst) after "ref" as the attribute "ref" of the element name "user" is a print-inhibited user file. This element 650 is a description that requires an external reference in the print policy file 621, and is a predetermined description of a print-inhibited item.

In this way, when print-inhibited items are described for various objects, a file that inhibits print processing can be defined. Also, inhibition items can be set not only in the file but also on external locations, and this external information can be referred to using an external reference tag.

Figure 7:
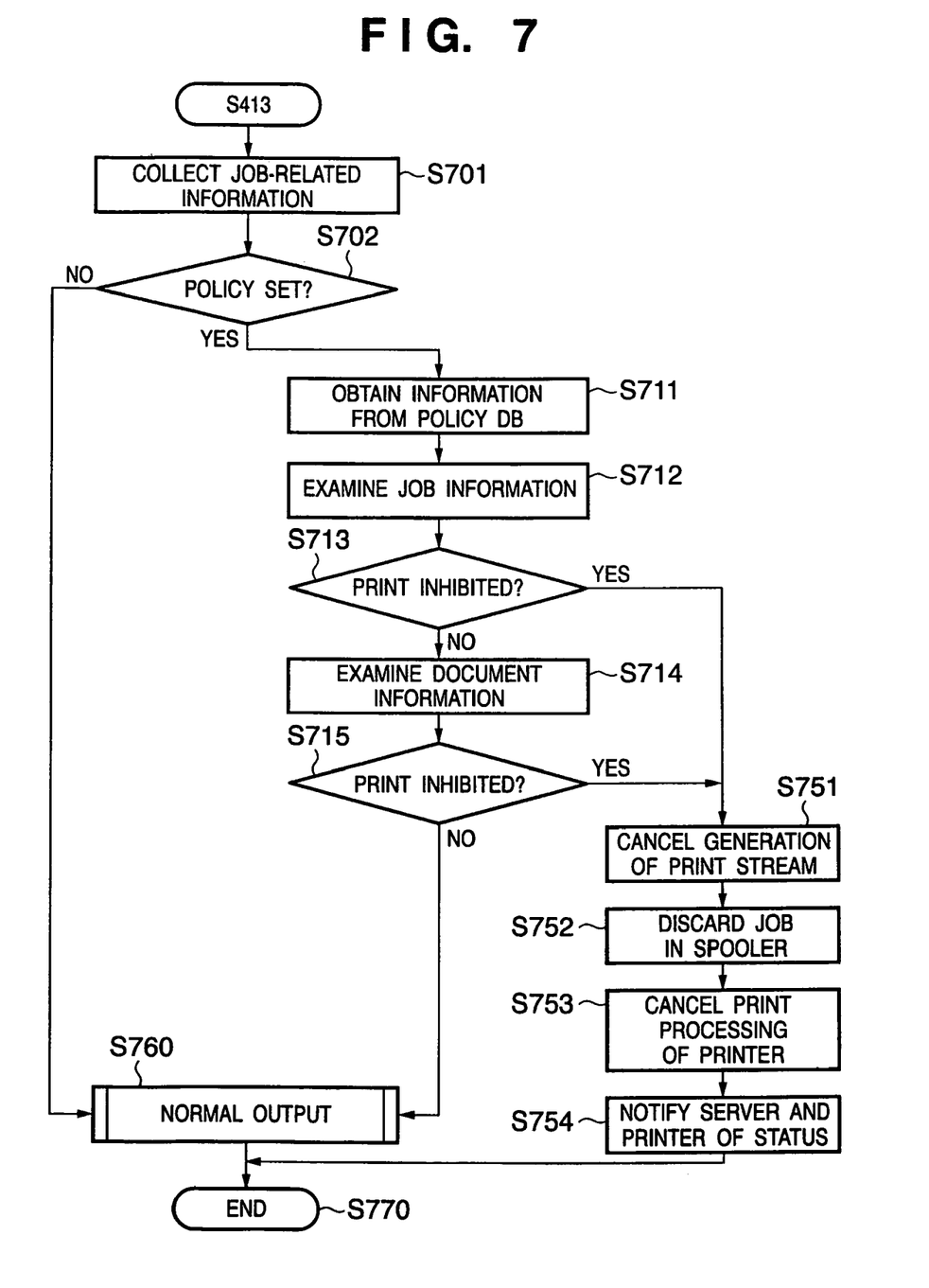
FIG. 7 is a flowchart of details of a series of processes in step S413 and subsequent steps, i.e., the processes for checking if a document designated by a print instruction is to be print-inhibited, and processing this document in accordance with the check result.

Details of a series of processes in step S413 and subsequent steps, i.e., the processes for checking if a document designated by a print instruction is to be print-inhibited, and processing this document in accordance with the check result, will be described below using FIG. 7 which is the flowchart of that processing.

Information associated with a document to be printed, i.e., job-related information is collected (step S701). As the job-related information, keywords, property, and the like in the document are collected.

It is checked if the check operation function is set (step S702). If no check operation function is set, the flow jumps to step S760 to execute the normal print operation (step S760). On the other hand, if the check operation function is set, the flow advances to step S711 to refer to policy data (step S711).

Job information of those associated with this job data collected in step S701 is referred to (step S712). It is then checked if this document data is inhibited from being printed (step S713) by checking if the referred job information corresponds to a print-inhibited item defined by job information in the policy data referred to in step S711 (for example, if a print-inhibited file name defined in the policy data is included the file name of this document).

If this document data is not inhibited from being printed, the flow advances to step S714, and document information of those associated with this document data collected in step S701 is referred to (step S714). It is then checked if this document data is inhibited from being printed (step S715) by checking if the referred document information corresponds to a print-inhibited item defined by document information in the policy data referred to in step S711 (for example, if a print-inhibited keyword defined in the policy data is included in text of this document).

As a result of this checking step, if this document is not inhibited from being printed, the flow advances to step S760 to execute the normal print operation (step S760), thus generating a print stream.

On the other hand, if it is determined in step S713 or S715 that the document data corresponds to print-inhibited data, the flow advances to step S751 and processing for generating print data (print stream) based on this document data is canceled (step S751). Jobs in the spooler (including a job for this document) are discarded (step S752), and print cancel processing to the printer 150 is executed (step S753). Finally, if a server apparatus is connected to the host computer 300, a print cancel message is sent to this server apparatus and printer 150 (step S754).

Figure 8:
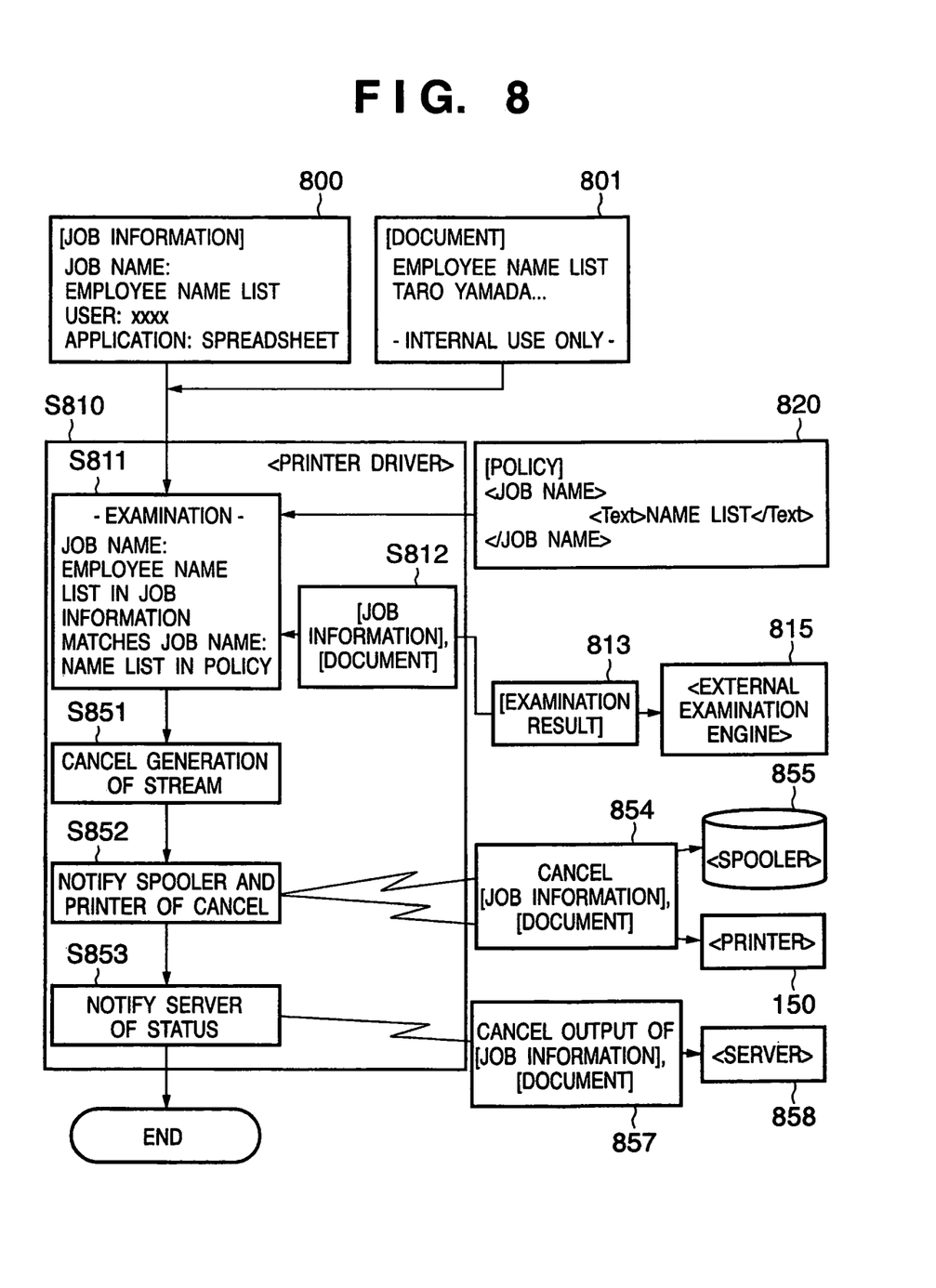
FIG. 8 is a flowchart of a series of processes for, when document data 801 is to be printed, inhibiting the document data 801 from being printed using policy data 820.

The print control processing for document data will be described below taking a practical example of document data and policy data. FIG. 8 is a flowchart of a series of processes for, when document data 801 is to be printed, inhibiting the document data 801 from being printed using policy data 820.

Reference numeral 800 denotes job information for document data 801. As can be seen from the job information 800, a keyword "name list" described in policy data 820 is described in the job information 800. Hence, the printer driver determines that this document data is print-inhibited data (step S811). That is, the printer driver internally performs examination with reference to the policy data 820 (step S811). As shown in FIG. 8, such processing may be executed by an examination engine 815 as an external program. In this case, the printer driver outputs the job information 800 and document data 801 to the examination engine 815, and receives an examination result.

The printer driver cancels processing for generating print data (print stream) based on this document data 801 (step S851), and discards jobs in a spooler 855 (including a job for this document) (step S852). The printer driver executes print cancel processing to the printer 150 (step S852). Finally, when a server apparatus 858 is connected to the host computer 300, the printer driver sends a print cancel message to this server apparatus 858 (step S853). That is, the printer driver inhibits generation of print data (print stream) based on the document data 801.

In the description of FIG. 8, the examination is done first, and when the examination result is OK, actual print processing starts. Alternatively, the examination and print processing may be parallelly done.

Figure 9:
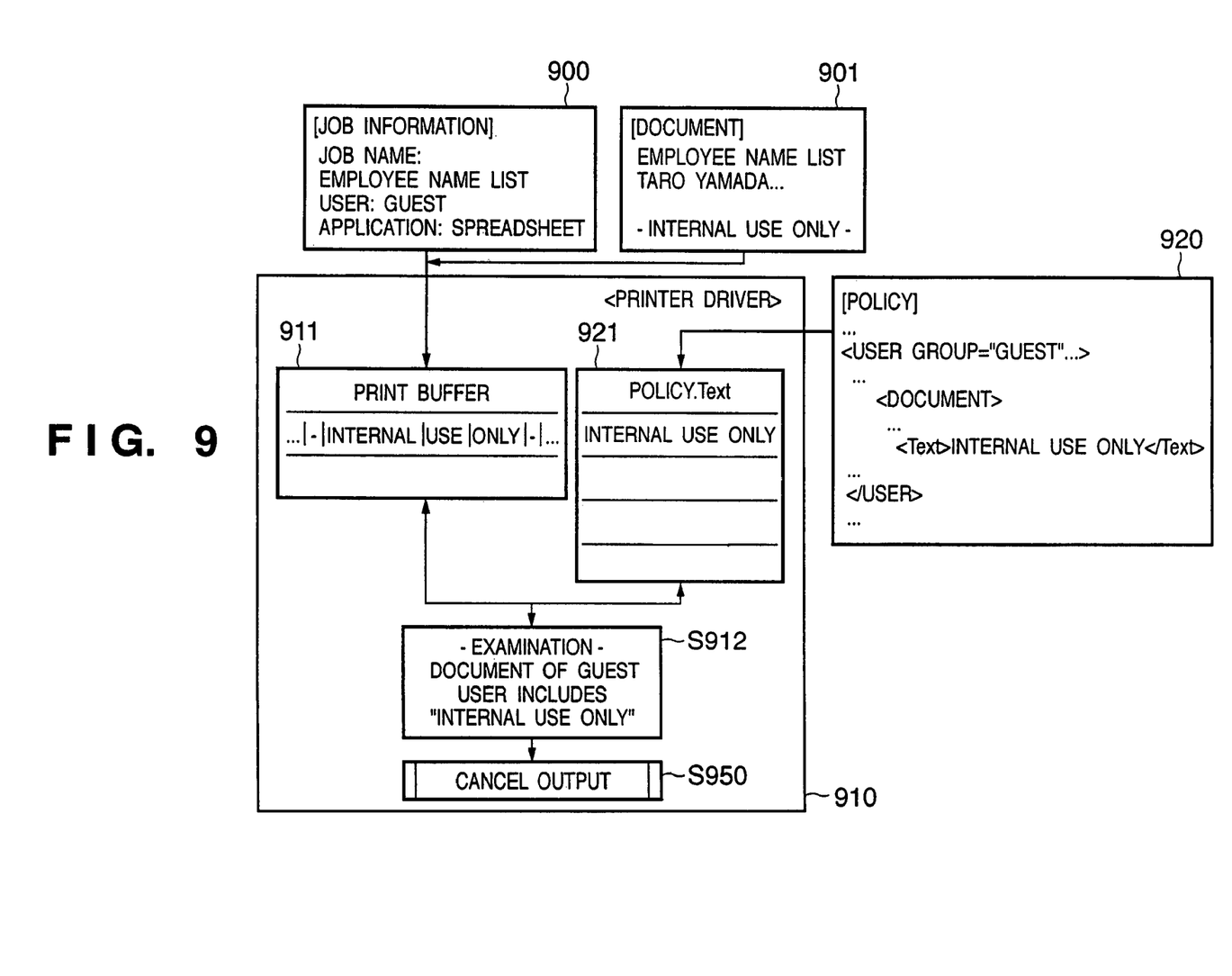
FIG. 9 is a flowchart of a series of processes for, when document data 901 is to be printed, inhibiting the document data 901 from being printed using policy data 920.

FIG. 9 is a flowchart of a series of processes for, when document data 901 is to be printed, inhibiting the document data 901 from being printed using policy data 920.

Reference numeral 900 denotes job information for document data 901. As can be seen from job information 900, this document data 901 is created by a guest user, and policy data 920 describes characters "guest". Hence, it is checked based on print-inhibited items against the guest user in the policy data if this document data 901 can be printed.

A keyword file 921 in the policy data 920 that specifies the print-inhibited items against the guest user includes a keyword "internal use only". As can be seen from 911, this keyword is described in text obtained by rendering the document data 901 on a print buffer. Hence, the printer driver determines that this document data is print-inhibited data (step S912).

Therefore, the print cancel processing is applied to this document data 901.

In the description of FIG. 9, the print processing and examination are simultaneously executed. Alternatively, the examination may be done first, and if the examination result is OK, actual print processing may start.

As for a print program which runs on the printer 150, the same as that which runs on the host computer 300 applies. Furthermore, the print program itself which runs on the printer 150 may be operated on the host computer 300, a print image may be sent from the host computer 300 to the print unit 17 via the print unit I/F 16, thus building the print control system.

The policy data can be edited as needed. A plurality of policy data may be created in correspondence with various purposes, and the policy data to be used may be selected as needed (of course, only one policy data may be created).

As described above, according to this embodiment, print processing can be canceled in accordance with the contents of the print job information and document, thus preventing leak of information. Also, depending on the setting and management of policy data, print processing of inadequate documents in terms of jobs can be reduced, thus obtaining a cost reduction effect.

The objects of the present invention are also achieved by supplying a recording medium (or storage medium), which records a program code of a software program that can implement the functions of the above-mentioned embodiments to the system or apparatus, and reading out and executing the program code stored in the recording medium by a computer (or a CPU or MPU) of the system or apparatus. In this case, the program code itself read out from the recording medium implements the functions of the above-mentioned embodiments, and the recording medium which stores the program code constitutes the present invention.

The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the recording medium is written in a memory of the extension card or unit.

When the present invention is applied to the recording medium, that recording medium stores program codes corresponding to the aforementioned flowcharts.

As many apparently widely different embodiments of the present invention can be made without departing from the spirit and scope thereof, it is to be understood that the invention is not limited to the specific embodiments thereof except as defined in the claims.

This application claims the benefit of Japanese Patent Application Nos. 2004-371887 filed on Dec. 22, 2004 and 2005-359122 filed on Dec. 13, 2005, which are hereby incorporated by reference herein in their entirety.

What is claimed is:

1. An information processing apparatus connected to a printing apparatus through a communication medium, comprising:

output unit configured to generate print data based on document data being transmitted from an application software, and outputting the generated print data to the printing apparatus;

referring unit configured to refer to an external print policy file which can be edited and has been selected from a plurality of print policy files;

determination unit configured to determine whether or not the document data includes a predetermined description defined in the referred external print policy file; and print data control unit configured to control generation of print data by said output unit in accordance with the determination result of said determination unit, wherein, the predetermined description is described in the external print policy file as a description which is directly stored in the external print policy file, or is described in the external print policy file as a description which requires an external reference, the external print policy file defines print-inhibited items as the predetermined description, when said determination unit determines that the document data includes the predetermined description defined in the referred external print policy file, said print data control unit cancels generation of print data by said output unit, the description being directly stored in the external print policy file is a print inhibited keyword in a text format, and the description requiring the external reference is a description externally referring to a user list inhibited print or a printing apparatus name list inhibited print, said determination unit determines whether or not a file name of the document data or property of the document data includes the print inhibited keyword or includes the description externally referring to the user list inhibited print or the printing apparatus name list inhibited print;

when said determination unit does not determine that the file name of the document data or the property of the document data includes the print inhibited keyword or includes the description externally referring to the user list inhibited print or the printing apparatus name list inhibited print, the print data is generated;

said determination unit determines, based on the print data generated after the determination regarding the file name or the property, whether or not the document data includes the print inhibited keyword or includes the description externally referring to the user list inhibited print or the printing apparatus name list inhibited print;

when said determination unit does not determine that the document data includes the print inhibited keyword or includes the description externally referring to the user list inhibited print or the printing apparatus name list inhibited print, the print data is outputted; and when said determination unit determines that the file name of the document data or the property of the document data includes the print inhibited keyword or includes the description externally referring to the user list inhibited print or the printing apparatus name list inhibited print, or that the document data includes the print inhibited keyword or includes the description externally referring to the user list inhibited print or the printing apparatus name list inhibited print, the print data is not outputted.

2. The apparatus according to claim 1, wherein the description which requires the external reference and is described in the print policy file is a description which refers to an external image.

3. The apparatus according to claim 1, wherein at least one of said output unit, said determination unit, and said print data control unit in said information processing apparatus is included in a printer driver installed in said information processing apparatus.

4. The apparatus according to claim 1, further comprising a display unit configured to display a policy screen as a user interface used for setting a policy to the document data, wherein the policy screen contains a first display area used for selecting whether or not setting the policy to the document data; and when the policy is not set to the document data in the first display area, said output unit, without the determination of said determination unit, generates the print data based on the document data and outputting the generated print data to the printing apparatus.

5. The apparatus according to claim 4, wherein the policy screen contains a second display area and a third display area, the second display area is used for selecting whether or not setting the print policy file automatically or manually when setting the policy to the document data, and the third display area is displayed when selecting that the print policy file is set manually, and is used for inputting storage location of the print policy file.

6. A method of controlling an information processing apparatus connected to a printing apparatus through a communication medium, comprising:

an output step of generating print data based on document data being transmitted from an application software, and outputting the generated print data to the printing apparatus;

a referring step of referring to an external print policy file which can be edited and has been selected from a plurality of print policy files;

a determination step of determining whether or not the document data includes a predetermined description defined in the referred external print policy file; and a print data control step of controlling generation of print data in the output step in accordance with the determination result of the determination step, wherein,
the predetermined description is described in the external print policy file as a description which is directly stored in the external print policy file, or is described in the external print policy file as a description which requires an external reference,
the external print policy file defines print-inhibited items as the predetermined description,
when said determination step determines that the document data includes the predetermined description defined in the referred external print policy file, said print data control step cancels generation of print data by said output step,
the description being directly stored in the external print policy file is a print inhibited keyword in a text format,
said determination step determines whether or not a file name of the document data or property of the document data includes the print inhibited keyword;
when said determination step does not determine that the file name of the document data or the property of the document data includes the print inhibited keyword, said determination step determines whether or not the document data includes the print inhibited keyword;
when said determination step does not determine that the document data includes the print inhibited keyword, the print data is outputted; and
when said determination step determines that the file name of the document data or the property of the document data includes the print inhibited keyword, or that the document data includes the print inhibited keyword, the print data is not outputted.

7. The method according to claim 6, wherein the description which requires the external reference and is described in the print policy file is a description which refers to an external image.

8. The method according to claim 6, wherein the print data control step includes a step of permitting, when it is determined as a result of the determination in the determination step that the document data does not include any predetermined description specified by the print policy, generation of print data in the output step.

9. The method according to claim 6, wherein at least one of the output step, the determination step, and the print data control step is included in processing implemented by a printer driver installed in the information processing apparatus.

10. The method according to claim 6, further comprising a display step of displaying a policy screen as a user interface used for setting a policy to the document data,
wherein the policy screen contains a first display area used for selecting whether or not setting the policy to the document data; and
when the policy is not set to the document data in the first display area, said output step, without the determination of said determination step, generates the print data based on the document data and outputting the generated print data to the printing apparatus.

11. The method according to claim 10, wherein the policy screen contains a second display area and a third display area,
the second display area is used for selecting whether or not setting the print policy file automatically or manually when setting the policy to the document data, and
the third display area is displayed when selecting that the print policy file is set manually, and is used for inputting storage location of the print policy file.

12. A computer-readable storage medium storing a program for making a computer implement a method of controlling an information processing apparatus of claim 6.

13. A non-transitory computer-readable storage medium storing a program for making a computer implement a method of controlling an information processing apparatus connected to a printing apparatus through a communication medium, the method comprising:
an output step of generating print data based on document data being transmitted from an application software, and outputting the generated print data to the printing apparatus;
a referring step of referring to an external print policy file which can be edited and has been selected from a plurality of print policy files;
a determination step of determining whether or not the document data includes a predetermined description defined in the referred external print policy file; and
a print data control step of controlling generation of print data by said output step in accordance with the determination result of said determination step,
wherein,
the predetermined description is described in the external print policy file as a description which is directly stored in the external print policy file, or is described in the external print policy file as a description which requires an external reference,
the external print policy file defines print-inhibited items as the predetermined description,
when said determination step determines that the document data includes the predetermined description defined in the referred external print policy file, said print data control step cancels generation of print data by said output step,
the description being directly stored in the external print policy file is a print inhibited keyword in a text format, and the description requiring the external reference is a description externally referring to a user list inhibited print or a printing apparatus name list inhibited print,
said determination step determines whether or not a file name of the document data or property of the document data includes the print inhibited keyword or includes the description externally referring to the user list inhibited print or the printing apparatus name list inhibited print;
when said determination step does not determine that the file name of the document data or the property of the document data includes the print inhibited keyword or includes the description externally referring to the user list inhibited print or the printing apparatus name list inhibited print, the print data is generated;
said determination step determines, based on the print data generated after the determination regarding to the file name or the property, whether or not the document data includes the print inhibited keyword or includes the description externally referring to the user list inhibited print or the printing apparatus name list inhibited print;
when said determination step does not determine that the document data includes the print inhibited keyword or includes the description externally referring to the user list inhibited print or the printing apparatus name list inhibited print, the print data is outputted; and
when said determination step determines that the file name of the document data or the property of the document data includes the print inhibited keyword or includes the description externally referring to the user list inhibited print or the printing apparatus name list inhibited print, or that the document data includes the print inhibited keyword or includes the description externally referring to the user list inhibited print or the printing apparatus name list inhibited print, the print data is not outputted.

* * * * *